United States Patent [19]

Sensibar

[11] E Re. 30,358

[45] Reissued Aug. 5, 1980

[54] HOPPER VALVE MODULE FOR HOPPER DREDGE

[75] Inventor: Ezra Sensibar, Chicago, Ill.

[73] Assignee: David Sensibar, Irrevocable Trust, Chicago, Ill.

[21] Appl. No.: 963,466

[22] Filed: Nov. 24, 1978

Related U.S. Patent Documents

Reissue of:

[64] Patent No.: 4,030,435
Issued: Jun. 21, 1977
Appl. No.: 679,158
Filed: Apr. 22, 1976

[51] Int. Cl.[2] ..... B63B 35/30

[52] U.S. Cl. ..... 114/36

[58] Field of Search ..... 114/26, 27, 31, 36; 222/50 F; 105/239-240, 244, 247, 248; 251/304, 309, 314, 320

[56] References Cited

U.S. PATENT DOCUMENTS

| | | | |
|---|---|---|---|
| 520,210 | 5/1894 | Lyster | 114/26 |
| 1,187,250 | 6/1916 | Brown et al. | 114/26 |
| 2,741,258 | 4/1956 | Bletcher et al. | 251/320 |
| 2,837,369 | 6/1958 | Stopps | 294/69 |
| 3,687,416 | 8/1972 | Mueller | 251/309 |

FOREIGN PATENT DOCUMENTS

| | | | |
|---|---|---|---|
| 10724 | 2/1880 | Fed. Rep. of Germany | 114/26 |
| 98118 | 3/1897 | Fed. Rep. of Germany | 114/36 |
| 586717 | 6/1931 | Fed. Rep. of Germany | 114/26 |
| 1531588 | 9/1969 | Fed. Rep. of Germany | 114/26 |
| 3666 | of 1911 | United Kingdom | 114/36 |

*Primary Examiner*—Edward R. Kazenske
*Assistant Examiner*—Jesùs D. Sotelo
*Attorney, Agent, or Firm*—Vogel, Dithmar, Stotland, Stratman & Levy

[57] ABSTRACT

A hopper valve module is adapted to be removably mounted in the well of a hopper of a hopper dredge vessel for opening and closing the hopper outlet, the module being attached to the vessel only adjacent to the hopper outlet so that the module may be removed as a unit. An annular ring is secured around the top of the hopper well with support arms extending upwardly therefrom to support a vertically extending cylindrical housing having a hydraulic drive cylinder mounted therein with a piston rod connected to a valve member which closes against a valve seat to provide a watertight seal.

In a first embodiment of the invention a conical valve member is coupled by a universal joint to the piston rod and has a replaceable resilient covering for sealing against the valve seat at the bottom of the hopper well. A watertight enclosure is provided for the drive means.

In a second embodiment, a cylindrical valve member is telescopically received in the housing and is coupled by a movable joint to the piston rod, the valve seat being at the top of the hopper well.

44 Claims, 16 Drawing Figures

FIG. 7A
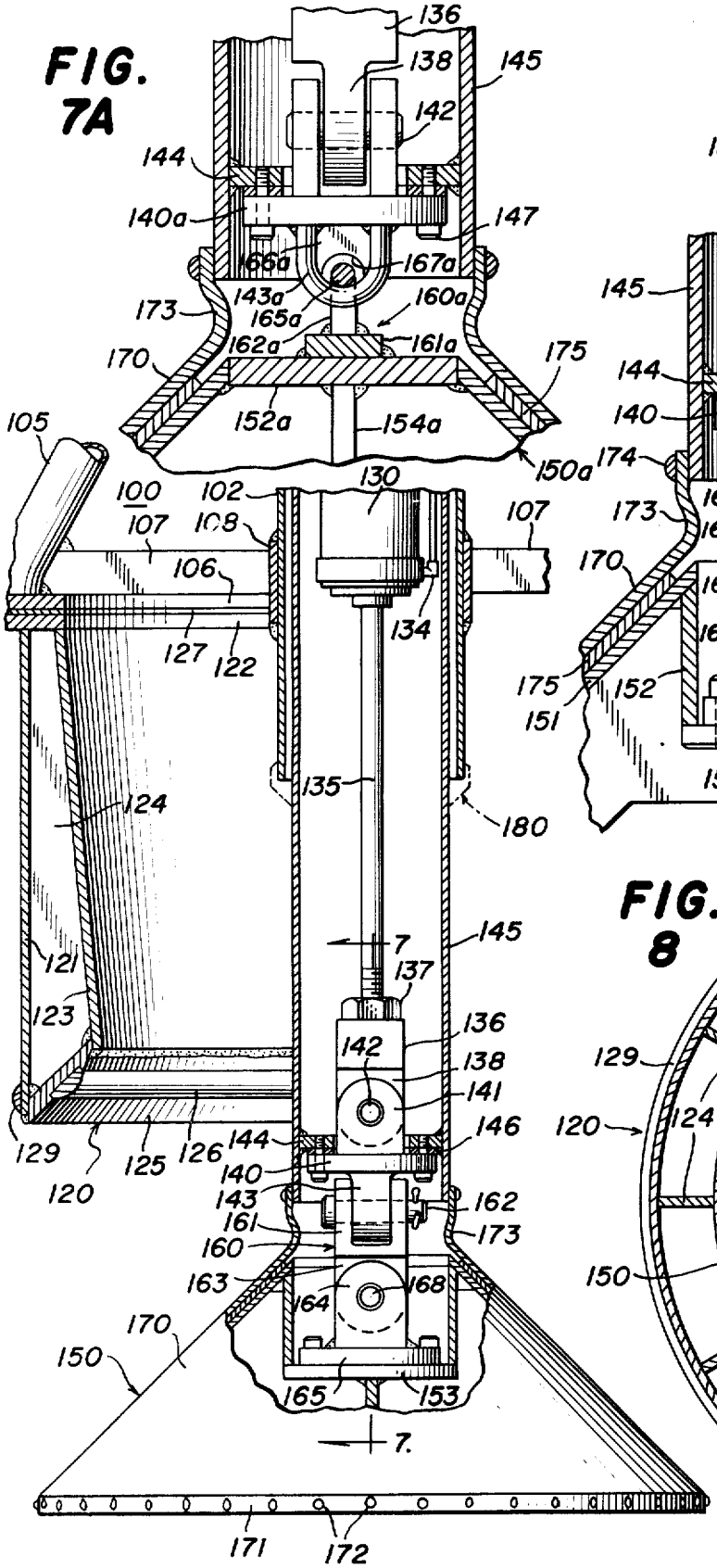
FIG. 6
FIG. 7
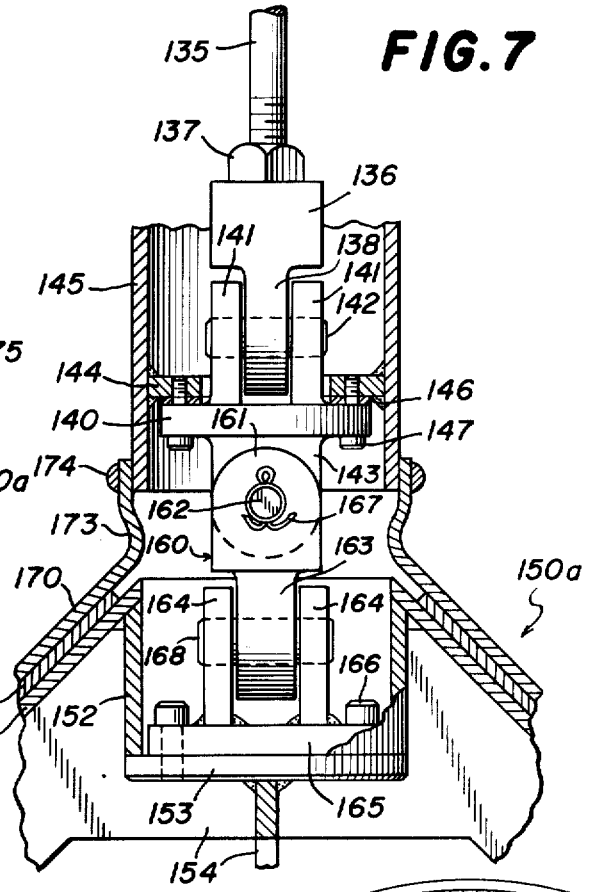
FIG. 8
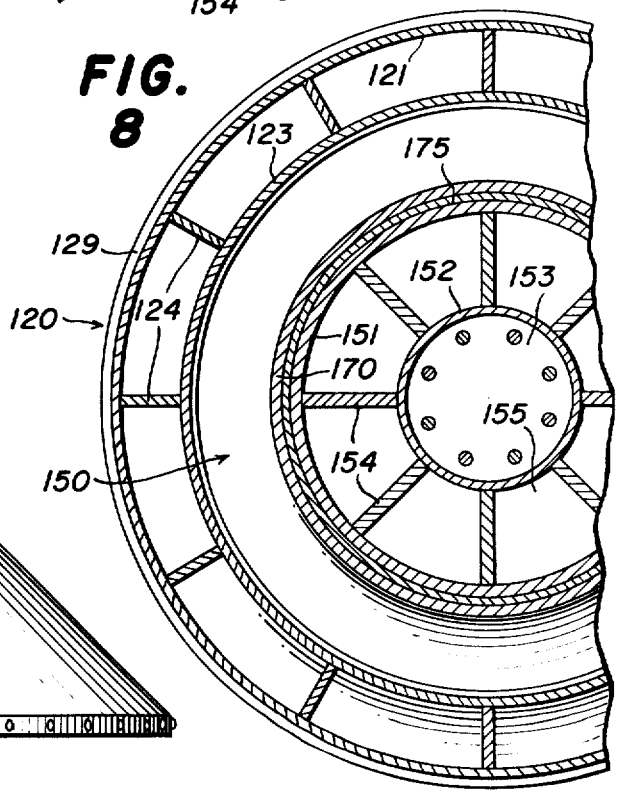

HOPPER VALVE MODULE FOR HOPPER DREDGE

Matter enclosed in heavy brackets [ ] appears in the original patent but forms no part of this reissue specification; matter printed in italics indicates the additions made by reissue.

BACKGROUND OF THE INVENTION

The present invention relates to hopper dredges, whether tug or self-propelled. A hopper dredge is a vessel carrying equipment for removing material from the submarine bottom in order to harvest the material for use or to deepen the waterway and form a navigation channel therein or the like. The material removed from the submarine bottom is deposited in hoppers on the vessel and, when the hoppers are full, the vessel transports the dredged material to a predetermined location for off-loading by pumping it overboard or by dumping the hopper contents through outlet openings at the bottoms of the hoppers. For this latter purpose, the hopper outlets are provided with discharge gates or valves.

Government regulations require that the hoppers of hopper dredges be essentially leakproof to prevent water pollution or shoaling by leakage of dredged material during transportation of the material to the off-loading site. Accordingly, it is essential that the hopper discharge gates or valves have effective watertight seals. Prior art hopper dredges have basically two types of hopper bottom closures, viz., generally rectangular hinged doors or cylindrical or conical poppet valve types. These hopper gates undergo severe wear in use, both because of their constant exposure to water and because of the attrition occasioned by the friction of the dredged material passing thereover during dumping of the hopper contents. Furthermore, the dredged material often includes debris which can become jammed in the hopper gates, thereby impairing the operation thereof and preventing watertight closure thereof. Thus, the hopper gates require frequent servicing and repair in order to keep the hoppers leakproof.

In prior art vessels, both the hinged door and poppet valve types of hopper bottom closures are controlled from the decks of the vessels by mechanical linkages extending vertically from the closure member upwardly through the hopper to suitable drive mechanism located on the vessel deck. The hopper closure gates cannot be serviced or repaired in place while the vessel is in service, since normally the gates are submerged under water. Nor can the gates readily be lifted to the decks of the vessel for service because of the mechanical linkage connecting the gates to the equipment on the vessel decks. Thus, by reason of this arrangement, repair or servicing of the hopper closure gates requires dry-docking of the vessel. This constitutes a considerable inconvenience and expense.

Furthermore, since the driving mechanism is situated at deck level above the cargo, the driving force to the gate or valve is transmitted by a long vertical rod which passes through the full depth of the cargo in the hopper. This cargo is usually sand, clay or mud, often having high internal friction. The vibration of the vessel tends to consolidate or "set" the cargo, so that the vertical rod "freezes" because of the high skin friction. In order to start the rod moving through the cargo mass, great force is required to overcome the initial "set" and then to continue to move it despite the skin friction.

The amount of force required is such that the rod must be of large diameter or else requires an annular ring or bearing to brace it midway, thus shortening the free column height. This ring or bearing in turn requires lateral struts to the sides of the hopper. The effect of this structure of bearings and struts is to impede the downward movement of the cargo which is essential to the dumping process. It also results in additional wear and maintenance.

The construction and operation of certain prior art hopper dredges is disclosed in a book prepared by the Office of the Chief of Engineers, U.S. Army, entitled "The Hopper Dredge," United States Government Printing Office, Washington (1954).

SUMMARY OF THE INVENTION

The present invention relates to an improvement in hopper dredge vessels and, more particularly, an improved type of hopper closure which can be serviced and repaired without dry-docking of the vessel. More particularly, the present invention relates to a hopper valve module which is removably mountable adjacent to the hopper outlet and which is connected to the vessel only adjacent to the hopper outlet, there being no connections or linkages which extend upwardly through the hopper to the deck of the vessel.

It is an object of this invention to provide a hopper valve module which eliminates the long rod and its attendant supports by placing the driving mechanism at the bottom of the hopper instead of above it, the mechanism being so designed as to operate efficiently when imbedded in the cargo.

It is another object of this invention to provide a hopper valve module which permits simple and efficient operation and insures a leakproof closure of the hopper.

Another object of this invention is to provide a hopper valve module which may be removably mounted in the hopper well from the deck of the dredge vessel and may be readily removed from the well and lifted to the deck of the vessel for repair or servicing.

Still another object of this invention is to provide a hopper valve module which affords efficient discharge of the hopper contents, and wherein the portions of the valve module most subject to wear during discharge of the hopper contents are readily replaceable for simple and economical maintenance of the leakproof condition of the valve module.

In summary, there is provided in a hopper dredge vessel having a hopper with an outlet at the bottom thereof, a removable hopper valve module comprising housing means removably mountable on the associated hopper adjacent to the outlet thereof, a valve member movable in use between a closed position closing the hopper outlet and an open position opening the hopper outlet, and drive means carried by the housing means and coupled to the valve member for effecting movement thereof between the open and closed positions thereof, the valve module being connected to the associated vessel only adjacent to the hopper outlet and being removable as a unit from the hopper.

It is one feature of the present invention that a hopper valve module includes improved drive and seal means to facilitate operation of the module and to insure leakproof closure of the hopper.

Another feature of this invention is that in the hopper valve module of the type set forth, the drive means is disposed within a hollow cylindrical housing disposed substantially vertically adjacent to the hopper outlet.

In connection with the foregoing feature, it is another feature of this invention that the hopper valve module further includes a cylindrical sleeve disposed telescopically within the housing in surrounding relationship with the drive means, the sleeve being coupled at its lower end to the valve member, and seal means coupled to the housing and the sleeve for providing watertight seals at the lower ends thereof.

Still another feature of this invention is that the hopper valve module includes a valve seat adjacent to the hopper outlet for engagement with the valve member in its closed position to close and seal the hopper outlet.

In connection with the foregoing feature, it is another feature of this invention that the drive means includes a movable joint coupled to the valve member to facilitate sealing engagement between the valve member and the valve seat.

Yet another feature of this invention is that the hopper valve module includes a discharge nozzle having an inverted frustoconical inner surface and carried by the housing means and communicating with the hopper outlet for improved discharge of the hopper contents through the nozzle.

Another feature of this invention is that the housing means includes a hollow cylindrical housing supported above the outlet and having a closed top and an open bottom spaced from the hopper bottom to provide a passage for dredged material to flow beneath the housing to the outlet, the valve member being cylindrical and movable between a closed position closing the passage and an open position opening the passage.

In connection with the foregoing feature, it is another feature of this invention that a valve seat is coupled to the support means and is disposed adjacent to the hopper outlet for sealing engagement with the cylindrical valve member in the closed position thereof.

Further features of the invention pertain to the particular arrangement of the parts of the hopper valve module whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 6 is a fragmentary side elevational view in partial vertical section of the valve module illustrated in FIG. 3, with the valve shown in the open position thereof;

FIG. 7 is a further enlarged fragmentary view in vertical section taken along the line 7—7 of FIG. 6, and illustrating the universal joint of the valve module of the present invention;

FIG. 7A is a view like FIG. 7 showing an alternative form of swivel joint for the valve module;

FIG. 8 is a fragmentary view in horizontal section taken along the line 8—8 in FIG. 3 and illustrating the internal construction of the valve member and valve liner;

DESCRIPTION OF THE PREFERRED EMBODIMENTS

Figure 1:
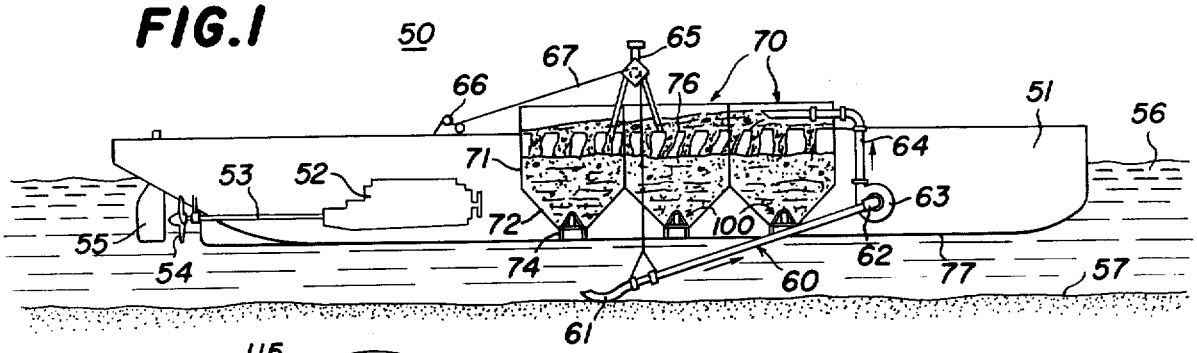
FIG. 1 is a diagrammatic side elevational view of a self-propelled hopper dredge, with portions of the hull broken away to illustrate the hoppers, each including a hopper closure module constructed in accordance with and embodying the features of a first embodiment of the present invention.

There is illustrated in FIG. 1 of the drawings a hopper dredge vessel, generally designated by the numeral 50 having a plurality of hoppers therein, each generally designated by the numeral 70. For purposes of illustration, the hopper dredge vessel 50 has been illustrated as being self-propelled, but it will be appreciated that it may be of any of several types, including ocean-going vessels as well as non-self-propelled vessels. The hopper dredge vessel 50 includes a hull 51 carrying a propulsion engine 52 connected by a drive shaft 53 to a propeller 54, which cooperates with a rudder 55 for propelling the vessel. It will be understood that more than one such propulsion system may be provided on the vessel 50.

Carried by the hull 51 is a dragarm 60 pivotally mounted outboard of the starboard side of the hull 51 by a trunnion 62, the diagram 60 extending aft from the trunnion 62 and being provided at its distal end with a drag 61 for scooping material from the bottom 57 of a body of water 56. The trunnion 62 is connected to a suction pump 63, which is in turn connected to a discharge pipe 64 which extends over the deck of the vessel 50 for depositing dredged material into the open tops of the hoppers 70. The vessel 50 is provided with a davit 65 carrying a cable 67 having one end thereof connected to the dragarm 60 adjacent to the drag 61 and having the other end thereof connected to hoist equipment 66 on the deck of the vessel 50, the cable 67 serving to raise and lower the dragarm 60 in a well-known manner.

It will be understood that dragarms 60 and davits 65 could be provided on both sides of the vessel 50. Furthermore, while a side loading type of hopper dredge vessel has been illustrated, it will be appreciated that any other type of dredge loading arrangement could be used, other such systems being illustrated in the aforementioned text "The Hopper Dredge," Section 4, pp. 20–22.

Frequently, an even number of hoppers 70 is provided in the vessel 50, one-half of the hoppers being arranged longitudinally of the vessel 50 along the starboard side of the vessel center line and the other half of the hoppers being arranged on the port side of the center line in side-by-side relationship with the starboard hoppers. This arrangement will help to prevent uneven loading of the vessel which might result in undesirable listing. Thus, the vessel 50 illustrated in FIG. 1 is provided with six hoppers 70, the starboard three of which are depicted in the drawing.

Figure 2:
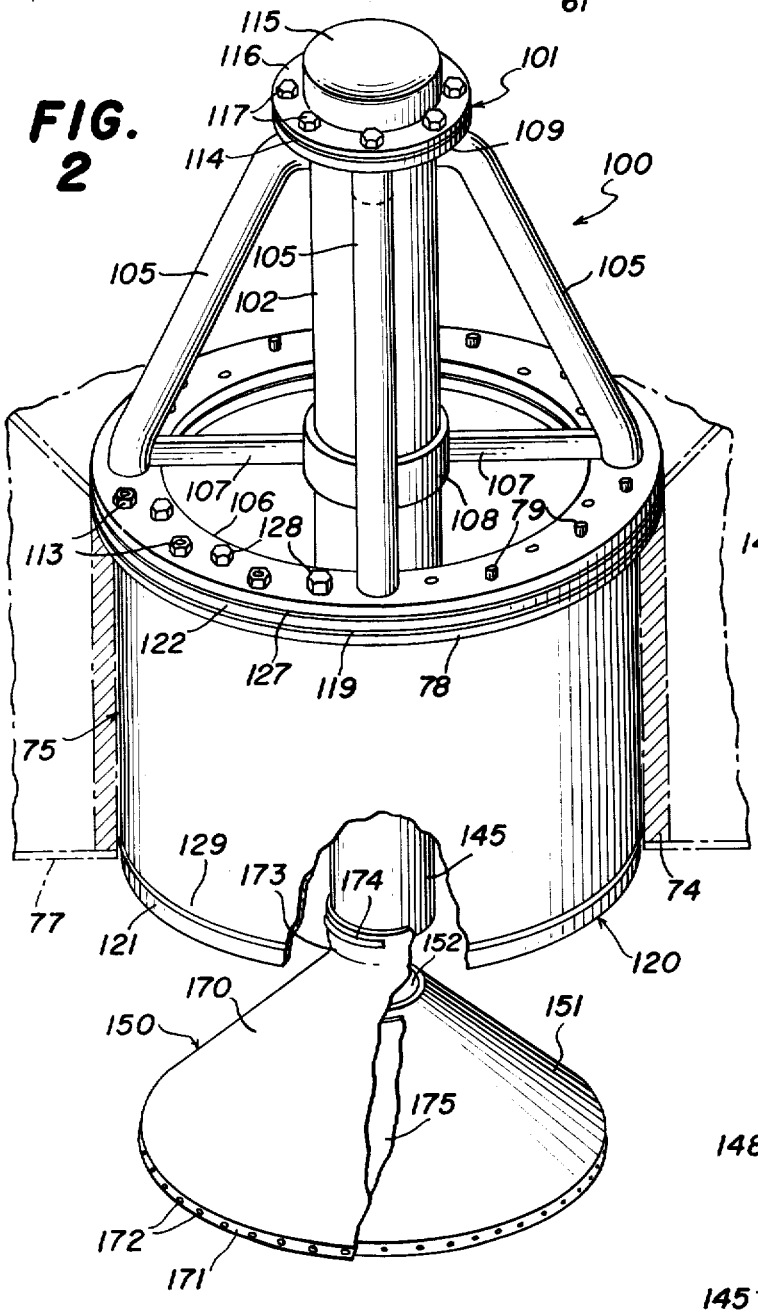
FIG. 2 is an enlarged perspective view of one of the hopper closure modules of FIG. 1, mounted in place in the hopper well, with the valve member in the open position thereof.
Figure 3:
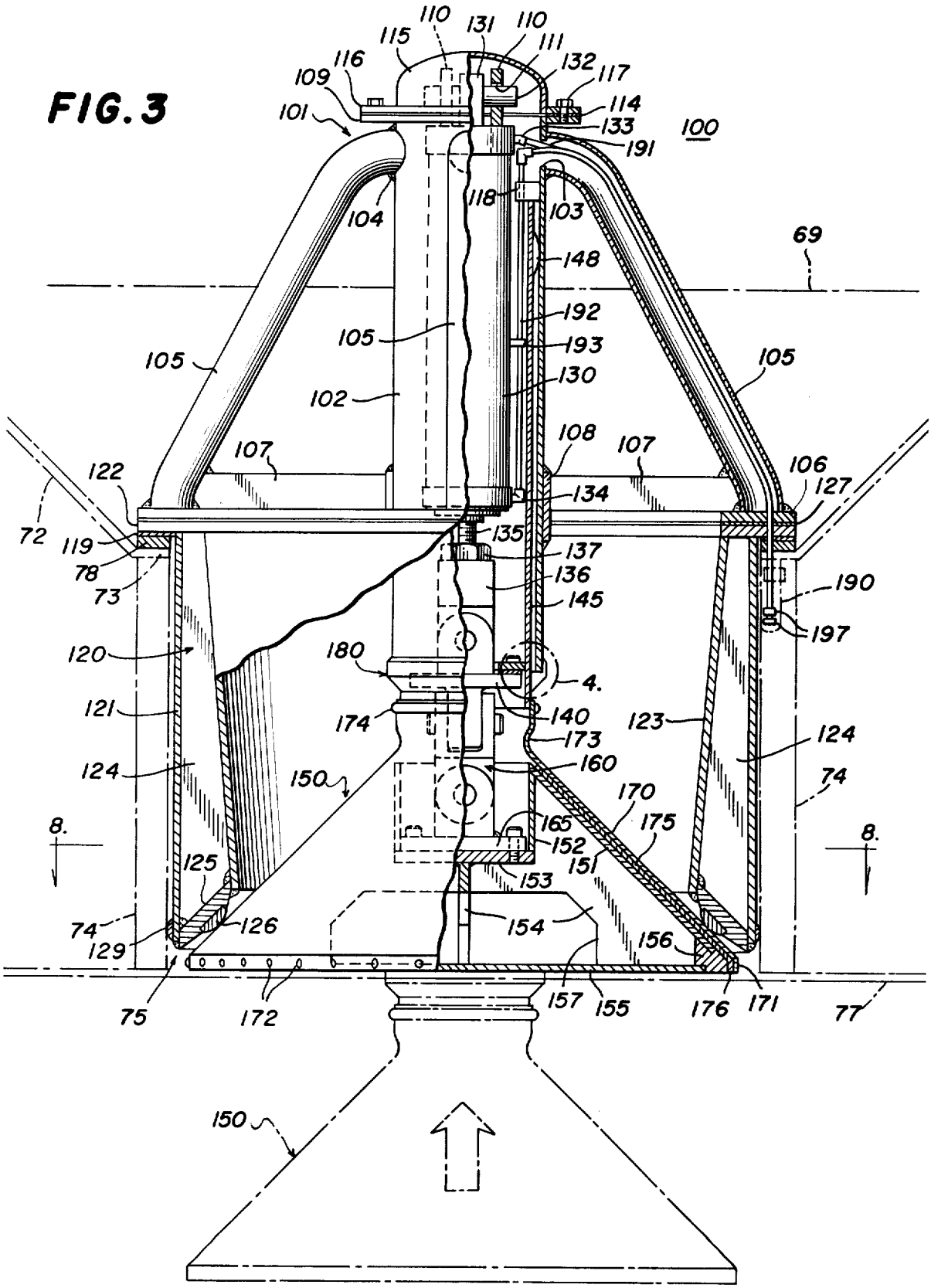
FIG. 3 is a further enlarged side elevational view in partial vertical section of the hopper valve module of FIG. 2, illustrating the internal construction of the module, the valve being shown in the closed position, with the open position illustrated in phantom.

Referring also to FIGS. 2 and 3 of the drawings, each of the hoppers 70 is provided with a generally rectangular arrangement of upper side walls 71, each being integral at the lower end thereof with a downwardly and inwardly sloping wall 72, the lower ends of the sloping walls 72 terminating in and being joined by an annular generally horizontal ledge 73. Extending vertically downwardly from the ledge 73 around the entire perimeter thereof is a cylindrical wall 74 defining a well 75 which forms a discharge outlet for the hopper 70, the bottom end of the well wall 74 terminating at the bottom plates 77 of the hull 51. When the hoppers 70 are empty and the outlets thereof are open, the hoppers 70 will draw water to a level within the hoppers which is designated by the numeral 69 in FIG. 3. Fixedly secured to the ledge 73 as by seal welding is an annular plate 78 having inner and outer diameters respectively substantially equal to the inner and outer diameters of the ledge 73 and provided with a plurality of externally threaded studs 79 (FIG. 2) spaced circumferentially therearound and extending vertically upwardly therefrom for a purpose to be explained more fully hereinafter. While each of the hoppers 70 has been illustrated as having a single discharge opening, it will be understood that hoppers having plural discharge openings could also be used.

Above the deck of the vessel 50 and overlying the hoppers 70 is a flume 76 which is provided with a plurality of openings therein. Each opening is controlled by an adjustable gate. The dredged material from the discharge pipe or pipes 64 is directed into the flume 76 and the gates are so manipulated as to effect a substantially equal distribution of the dredged material among the several hoppers. It will be appreciated that any suitable type of distribution system for the dredged material could be used, other such systems being disclosed in the aforementioned text "The Hopper Dredge," chapter VII.

Referring now more particularly to FIGS. 2 through 7 and 8 of the drawings, there is illustrated a hopper valve module, generally designated by the numeral 100 for disposition in the well 75 of a hopper 70 to effect opening and closing of the outlet thereof. It will be appreciated that one of the valve modules 100 is disposed in each well of each of the hoppers 70. The valve module 100 includes a housing assembly, generally designated by the numeral 101 and includes a substantially vertically disposed hollow cylindrical housing 102 which is preferably formed of steel. Equiangularly spaced about the cylindrical housing 102 and fixedly secured thereto adjacent to the upper end thereof as by welds 104 are four tubular support arms or struts 105, the struts 105 extending downwardly and outwardly from the cylindrical housing 102, with the lower ends thereof being welded to an annular base plate 106. Respectively welded to the lower ends of the struts 105 and extending radially inwardly therefrom are four brace bars 107, the inner ends of which are welded to a connecting collar 108 which is in turn welded to the outer surface of the cylindrical housing 102, thereby to form a rigid housing assembly. Preferably, the cylindrical housing 102 is provided with an aperture 103 therein communicating with the interior of one of the tubular struts 105 for a purpose to be explained more fully hereinafter.

Fixedly secured as by welding to the inner surface of the cylindrical housing 102 adjacent to the upper end thereof is a pair of spaced-apart mounting blocks 110 extending upwardly above the upper end of the cylindrical housing 102 and provided with coaxial openings 111 therethrough. Formed on the cylindrical housing 102 at the upper end thereof and extending radially outwardly therefrom is an annular attachment flange 109 for the mounting of a housing cap 115. The cap 115 is also provided with an annular attachment flange 116 which, in use, overlies the attachment flange 109, being spaced therefrom by a gasket 114 and being fixedly secured thereto by a plurality of bolts 117, thereby providing a watertight seal for the upper end of the cylindrical housing 102. Fixedly secured to the inner surface of the cylindrical housing 102 adjacent to the upper end thereof but below the level of the aperture 103 is a stop member 118 for a purpose which will be explained hereinafter.

The baseplate 106 of the housing assembly 101 is dimensioned to rest upon the seat plate 78 with the struts 105 extending upwardly therefrom, the cylindrical housing 102 being disposed axially of the well 75 and of such a length that the lower end thereof is disposed in the well 75 while the upper end thereof is disposed within the dredged cargo but below the upper ends of the sloping wall 72 of the hopper 70.

The hopper valve module 100 also includes a valve liner assembly, generally designated by the numeral 120, and including an outer cylindrical wall 121 having an outer diameter slightly less than the diameter of the well 75. Fixedly secured to the cylindrical wall 121 at one end thereof is a radially outwardly extending annular mounting flange 122 having dimensions substantially identical to the dimensions of the baseplate 106 of the housing assembly 101. Also fixedly secured to the mounting flange 122 and disposed inwardly of the cylindrical wall 121 is an inverted frustoconical wall 123, the lower end of which is spaced a slight distance above the adjacent end of the cylindrical outer wall 121. Interconnecting the walls 121 and 123 are a plurality of equiangularly spaced-apart gusset plates 124 which form a rigid liner structure. Interconnecting the distal or lower ends of the walls 121 and 123 and closing the space therebetween is an annular inclined bottom closure ring 125 having fixedly secured to the outer surface thereof a seal ring, preferably formed of a hard corrosion-resistant nickel-copper alloy such as that sold under the trademark MONEL.

The mounting flange 122 is adapted to overlie the plate 78, being separated therefrom by a rubber gasket 119, the studs 79 extending through complementary openings in the gasket 119 and the mounting flange 122. When mounted in this position, illustrated in FIGS. 2 and 3, the outer wall 121 of the valve liner assembly 120 is disposed in the well 75 spaced inwardly a slight distance, preferably about one-quarter inch, from the side wall 74 thereof, the lower end of the side wall 121 being disposed a slight distance above the bottom of the well 75. Preferably, there is formed on the outer surface of the side wall 121 adjacent to the lower end thereof an annular resilient seal ring 129 for closing the space between the valve liner assembly side wall 121 and the well side wall 74 and forming a watertight seal therebetween.

In use, the housing assembly 101 is mounted atop the valve linear assembly 120, with the baseplate 106 overlying the mounting flange 122 and being spaced therefrom by a rubber gasket 127 and secured thereto by a plurality of circumferentially spaced-apart bolts 128. It will be understood that similar bolts will pass through the other holes shown in the plate 106 in FIG. 2. The entire bolted-together assembly may then be mounted on the plate 78 and gasket 119, with the studs 79 extending upwardly through complementary openings in the mounting flange 122, base-plate 106 and gaskets 119 and 127 and being of sufficient length to extend above the upper surface of the baseplate 106 to be secured in place by suitable cap nuts 113. Although some studs 79 are shown for purposes of illustration, it is understood that they too will be fitted with cap nuts 113.

Mounted within the cylindrical housing 102 is a hydraulic drive cylinder 130, the upper end of the cylinder 130 being provided with a mounting tongue 131 disposed in use between the mounting blocks 110, a mounting pin 132 being inserted through the openings 111 and a complementary opening in the mounting tongue 131 for supporting the drive cylinder 130. The cylinder 130 is provided at the upper and lower ends thereof, respectively, with hydraulic fittings 133 and 134, the cylinder 130 also having a piston rod 135 extending vertically downwardly from the bottom thereof axially of the cylindrical housing 102. The piston rod 135 is threadedly engaged with a connecting block 136, being adjustably held in place by a locknut 137.

The connecting block 136 is provided with a depending tongue 138 being disposed between the upstanding clevis legs 141 of a clevis seal plate 140, a pin 142 extending through complementary openings in the tongue 138 and clevis legs 141 for forming a connection therebetween. The clevis seal plate 140 is circular in shape having a diameter less than the inner diameter of the cylindrical housing 102, a tongue 143 being provided depending from the clevis seal plate 140.

Disposed in surrounding relationship with the drive cylinder 130 and the clevis seal plate 140 and telescopically received within the cylindrical housing 102 is a cylindrical metal sleeve 145 provided on the inner surface thereof adjacent to the lower end thereof with a radially inwardly extending annular attachment flange 144 (see FIGS. 6 and 7). The valve module 100 is assembled so that the clevis seal plate 140 underlies the attachment flange 144 and is spaced therefrom by a rubber gasket 146 and fixedly secured thereto by a plurality of spaced-apart bolts 147, thereby cooperating to form a watertight closure at the lower end of the cylindrical sleeve 145.

It will be understood that as the piston rod 135 moves up and down, the cylindrical sleeve 145 moves with it within the cylindrical housing 102, the stop member 118 being disposed for engagement with the upper end of the cylindrical sleeve 145 to limit the upward travel thereof. Disposed on the outer surface of the cylindrical sleeve 145 adjacent to the upper end thereof is a plurality of circumferentially spaced-apart facing members 148 (FIG. 5) which are preferably formed by built-up welds of an abrasion-resistant material such as that sold under the trade-mark COLMONOY which are then finished to provide wear surfaces for the cylindrical sleeve 145.

The valve module 100 is provided with a conical valve member of the poppet type, generally designated by the numeral 150, including a frustoconical metal wall 151, preferably formed of steel, the upper end of which is integral with a depending cylindrical wall 152 which is closed at the bottom end thereof by a circular baseplate 153 for defining a well at the upper end of the valve member 150. Fixedly secured to the frustoconical wall at the lower end thereof and extending about the entire circumference thereof is an annular base ring 156. Interconnecting the walls 151 and 152, the baseplate 153 and the base ring 156, are a plurality of equiangularly spaced-apart gusset plates 154, preferably eight in number, which serve to rigidify the valve member 150. Preferably the bottom central portions of the gusset plates 154 are cut away as at 157 to form a central bottom recess in the valve member 150. Connected to the base ring 156 and closing the bottom of the valve member 150 is a flat circular bottom plate 155.

The valve member 150 is coupled to the clevis seal plate 140 by a universal joint, generally designated by the numeral 160, the universal joint 160 having an upwardly extending pair of clevis legs 161 receiving the tongue 143 therebetween and being connected thereto by a pin 162 extending through complementary openings in the tongue 143 and clevis legs 161. The universal joint 160 is also provided with a depending tongue 163 received in use between the upstanding clevis legs 164 of a circular valve clevis plate 165 which is secured to the well baseplate 153 of the valve member 150 by bolts 166. The tongue 163 and clevis legs 164 are interconnected by a pin 168 extending through complementary openings therein. Preferably, the pin 162 is provided at one end thereof with an enlarged head, the other end being retained in place by a cotter pin 167.

The valve member 150 is provided with a replaceable resilient lining 170 covering the outer surface of the frustoconical wall 151. Preferably, the lining 170 is formed of neoprene rubber and is vulcanized to a metal backing sheet 175 which, in use, overlies and contacts the outer surface of the frustoconical wall 151, for maintaining the shape of the lining 170 and facilitating mounting thereof on the valve member 150. The lining 170 is provided at the lower end thereof with a cylindrical lip 171 which overlies a like cylindrical lip portion 176 of the backing sheet 175 for receiving therethrough a plurality of circumferentially spaced-apart bolts 172 for securing the lining 170 and the backing sheet 175 to the base ring 156 of the valve member 150. The lining 170 is provided at the upper end thereof with a flexible throat or collar portion 173 which extends upwardly above the valve member 150 and fits over the lower end of the cylindrical sleeve 145 in surrounding relationship therewith, being held in place thereon by a throat clamp 174. Preferably, the throat or collar portion 173 of the lining 170 is slack to accommodate sidewise movements of the valve member 150 with respect to the cylindrical sleeve 145. It can be seen that the throat portion 173 of the lining 170 cooperates with the cylindrical sleeve 145 to enclose the universal joint 160.

Figure 4:
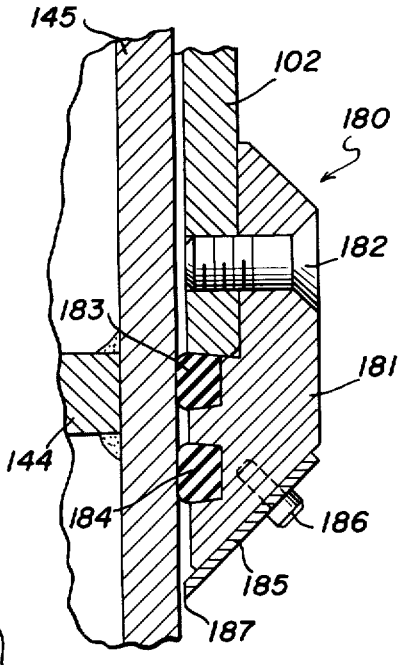
FIG. 4 is a further enlarged fragmentary view in vertical section of the sleeve seal and scraper assembly, designated by the numeral 4 in FIG. 3.
Figure 5:
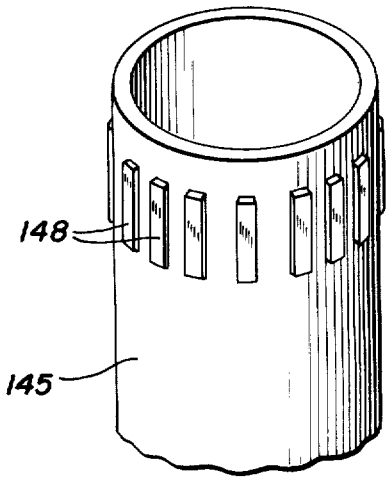
FIG. 5 is a fragmentary perspective view of the upper end of the cylindrical sleeve of the valve module of FIG. 3, showing the wear surfaces thereon.

In order to insure that the drive cylinder 130 is provided with a watertight enclosure, a seal assembly, generally designated by the numeral 180, is mounted on the cylindrical housing 102 at the lower end [therof] *thereof.* Referring in particular to FIG. 4 of the drawings, the seal assembly 180 includes an annular seal holder 181 extending circumferentially about the cylindrical housing 102 and secured thereto by a plurality of mounting screws 182. Carried by the seal holder 181 immediately below the bottom end of the cylindrical housing 102 are two annular spaced-apart resilient seal rings 183 and 184 disposed in engagement with the outer surface of the cylindrical sleeve 145, with the upper seal ring 183 engaging the bottom edge of the cylindrical housing 102 for forming a watertight seal between the sleeve 145 and the cylindrical housing 102, while accommodating vertical movement of the sleeve 145 with respect to the cylindrical housing 102. There may also be provided an annular scraper 185 secured to the seal holder 181 by a plurality of mounting screws 186 and having a scraping edge 187 disposed closely adjacent to the outer surface of the cylindrical sleeve 145 below the seal rings 183 and 184. The scraper 185 will serve to remove most foreign material from the outer surface of the sleeve 145 as it moves upwardly, thereby reducing wear on the seal rings 183 and 184.

Preferably, the cylinder 130 is hydraulically operated, but [is] *it* will be understood that any type of fluid drive could be used. The hydraulic fittings 133 and 134 of the drive cylinder 130 are respectively coupled to hydraulic lines 191 and 192 for connection to an associated hydraulic pump and reservoir system. The hydraulic line 192 is retained in place by a retainer 193 on the cylinder 130, the lines 191 and 192 both extending through the aperture 103 in the cylindrical housing 102 and downwardly through the associated one of the tubular struts 105 and thence through complementary passages in the baseplate 106, gasket 127 and mounting flange 122 and being provided at the distal ends thereof with fittings 197. Complementary passages are also formed in the gasket 119, the plate 78 and the hopper ledge 73 so that when the valve module 100 is mounted in place in the hopper 70, the free ends of the hydraulic lines 191 and 192 may be passed therethrough and into a watertight coupling compartment 190 formed in the side wall 74 of the well 75. The compartment 190 may be formed of a pair of pipe sections coupled together by a threaded collar or nipple, the upper pipe section being welded to the hopper ledge 73 and the lower pipe section being capped at the lower end thereof.

The purpose of the watertight coupling compartment 190 is to prevent flooding of the hull of the vessel 50 when the valve module 100 is removed from the hopper 70. Thus, absent the watertight coupling compartment 190, when the hydraulic lines 191 and 192 are disconnected at the fittings 197, and the valve module 100 removed, the passage through the hopper ledge 73 would be exposed to the water in the hopper, which would pour through the passage and flood the adjacent hull compartment. By use of the watertight coupling compartment 190, when the hydraulic lines 191 and 192 are disconnected at the fittings 197 preparatory to removal of the valve module 100, the lower capped pipe section is first screwed in place over the fittings 197, thus capping the passage through the hopper ledge 73. Then, when the valve module 100 is removed, only the watertight coupling compartment 190 will fill with water. When the valve module 100 is replaced in the hopper 70 and the passage through the hopper ledge 73 resealed, the bottom pipe section of the watertight coupling compartment 190 is removed, draining the small amount of water therein and exposing the fittings 197 for reconnection to the hydraulic system.

In use, the housing assembly 101 is preassembled with the valve liner assembly 120 by means of the gasket 127 and bolts 128, as described above, and the entire valve module 100 is then inserted in place in the hopper 70, with the mounting flange 122 overlying the gasket 119 and plate 78, and with the valve liner 120 extending downwardly into the well 75. The studs 79 extend upwardly through and above the baseplate 106 and are held in place by the cap nuts 113. During insertion of the valve module 100, the free ends of the hydraulic lines 191 and 192 are passed through the complementary passages in the plate 78 and the hopper ledge 73 and into the watertight coupling compartment 190. As the valve liner 120 is inserted into the well 75, the seal ring 129 on the outer surface of the cylindrical wall 121 serves to wipe foreign material from the inner surface of the well wall 74. Preferably, means such as a lubricant fitting is provided for forcing sealing material, under pressure, into the space between the well wall 74 and the valve liner wall 121 for forcing the water therefrom and cooperating with the seal ring 129 to form a watertight seal about the valve liner 120. While any type of suitable material may be used, it has been found that tallow provides a good seal material which is non-polluting. This seal material also serves to inhibit the growth of marine organisms in the space between the valve liner 120 and the well wall 74. The hydraulic lines 191 and 192 are then connected at the fittings 197 in the manner described above.

It is a significant feature of the present invention that, in use, the valve module 100 is located in the hopper well 75 and is connected to the hopper 70 and to the vessel 50 only in the vicinity of the well 75. There are no connections, mechanical or otherwise, extending upwardly from the valve module 100 through the hopper 70 and to the deck of the vessel 50. This arrangement affords ready access to the valve module 100 and permits easy removal thereof from the hopper 70. More particularly, when it is desired to remove the valve module 100 for repair, servicing or the like, a crane on the deck of the vessel 50 may be used to hoist the valve module 100 up through the hopper 70 to the deck of the vessel 50, after the valve module 100 has been disconnected from the studs 79. The valve module 100 may then be serviced on the deck of the vessel 50, without the necessity of dry-docking the vessel. When the valve module 100 is removed from the well 75, the sealing material in the space between the well liner 120 and the well wall 74 is also pulled out, and any residue may readily be scraped from the well wall 74.

When the valve module 100 is remounted in the well 74, the seal ring 129 wipes downwardly along the inner surface of the well wall 74 removing any loose foreign material thereon, whereupon, after the valve module 100 has been bolted in place, new sealing material may be fed under pressure into the space between the valve liner 120 and the well wall 74. It will, of course, be appreciated that prior to removal of the valve module 100, it is necessary to disconnect the hydraulic lines 191 and 192 at the fittings 197 and then close the bottom of the watertight coupling compartment 190 as was described above. After the valve module 100 is remounted in the well 75, the hydraulic lines are reconnected in the manner described above.

In operation, when dredged material is pumped into the hopper 70, it fills the valve liner 120 above the valve member 150 and then fills the rest of the hopper 70 to the desired level. When it is desired to empty the hopper 70, hydraulic fluid is injected into the upper end of the cylinder 130 through the fitting 133, thereby moving the piston rod 135 and the valve member 150 downwardly from the position illustrated in solid line in FIG. 3 to the position illustrated in broken line in FIG. 3 and in solid line in FIGS. 2 and 6. The dredged material is then discharged by gravity through the nozzle defined by the inner wall 123 of the valve liner 120. In this regard, it will be noted that the particular inverted frustoconical shape of the wall 123 is designed to maximize the efficiency of discharge for the particular size discharge opening used, by minimizing the frictional losses during discharge. It will be appreciated that the free flow of the dredged cargo through the hopper 70 and the discharge nozzle is facilitated by the absence of drive linkage and lateral support structure disposed in the hopper above the valve module 100. Thus, the dredged cargo cannot consolidate or "set" against such drive linkage and support structure and is permitted to flow freely to and through the discharge opening when the valve module 100 is in an open condition. Because the drive cylinder 130 and piston rod 135 are isolated from engagement with the dredged cargo and attendant frictional losses, the power necessary to operate the valve module 100 is minimized.

It is an important feature of this invention that the universal joint 160 between the valve member 150 and the piston rod 135 permits movement of the valve member 150 in any direction, thereby facilitating discharge of the hopper contents. More particularly, as the discharge material impacts on the lowered valve member 150, it effects movement of the valve member 150 and may move it completely to one side. This movement of the valve member 150 is also facilitated by the slack in the throat portion 173 of the resilient valve lining 170. When the contents of the hopper 70 have been completely discharged, hydraulic fluid is injected into the bottom of the cylinder 130 through the fitting 134 and is exhausted therefrom through the fitting 133, thereby retracting the piston rod 135 and the valve member 150.

Referring now to FIG. 7a of the drawings, there is illustrated an alternative form of joint for the valve member of the valve module 100. In this alternative embodiment, there is provided a clevis and seal plate 140a, which is identical in construction, assembly and operation to the clevis and seal plate 140, except that in place of the tongue 143 there are provided two spaced-apart, generally U-shaped loops 143a disposed in use with the bight portions thereof extending downwardly and with the leg portions thereof respectively fixedly secured to the bottom surface of the clevis and seal plate 140a as by welding. There is also provided a valve member, generally designated by the numeral 150a, which is identical in construction, assembly and operation to the valve member 150, except that the cylindrical center well 152 and well baseplate 153 have been replaced by a circular top wall 152a which is welded to and completely closes the upper end of the frustoconical wall 151. Accordingly, the valve member 150a is provided with gusset plates 154a which are identical to the gusset plates 154 except that they extend all the way up to and are fixedly secured to the bottom surface of the top plate 152a.

The valve member 150a is coupled to the clevis and seal plate 140a by a swing joint 160a, which includes a baseplate 161a disposed centrally of and fixedly secured to the upper surface of the top wall 152a of the valve member 150a. Fixedly secured to the center of the baseplate 161a and extending vertically upwardly therefrom is a post 162a, the upper end of which is fixedly secured to the midpoint of a horizontally extending crossbar 165a. In use, the post 162a extends upwardly between the loops 143a of the clevis seal plate 140a, with the opposite ends of the crossbar 165a respectively extending laterally through the loops 143a so as to be supported upon the bight portions thereof for free swinging and pivotal movement with respect thereto. There may also be provided between the loops 143a a block 166a, mounted to the underside of the clevis seal plate 140a, and provided with an arcuate concave lower surface 167a disposed a slight distance above the crossbar 165a as it rests in the loops 143a, whereby the block 166a serves to limit the lost motion of the crossbar 165a with respect to the clevis seal plate 140a and the loops 143a as the valve member 150a is moved upwardly and downwardly between the closed and open positions thereof.

The operation of the valve module 100 with the swing joint 160a is the same as with the univeral joint 160, except that it will be understood that the swing joint 160a affords a more limited range of movement than does the universal joint 160, but has the advantage of a less complex and costly construction.

The universal joint 160 or swing joint 160a permits free swiveling or swinging movement of the valve members 150 or 150a to allow them to find a firm seat against the seal ring 126 of the closure ring 125. In this regard, it is another important feature of the present invention that the rigid hard seal ring 126 may be depressed slightly into the resilient valve lining 170 to form a watertight closure of the hopper outlet, assuring that the hopper 70 will be maintained leakproof.

It is another important feature of this invention that the valve lining 170 is replaceable. Of the two mating seal closure members 126 and 170, the lining 170 receives by far the greater wear because of the impacting thereagainst of the dredged material during filling and emptying of the hopper 70. Thus, to facilitate servicing of the closure assembly for maintaining leakproof closure, the lining 170 has been made readily removable and replaceable by simply disconnecting the bolts 172 and the throat clamp 174, whereupon a new lining 170 is installed and the valve module 100 is again ready for service.

It will also be appreciated that the construction of the present invention provides a watertight enclosure for the drive cylinder 130 and the linkage coupling it to the valve member 150, preventing contact thereof with water or with abrasive dredged material. Thus, it will be appreciated that the throat portion 173 of the lining 170, the throat clamp 174, the clevis seal plate 140, the gasket 146 and attachment flange 144 all serve to provide an enclosure for the universal joint 160 and a watertight seal for the lower end of the cylindrical sleeve 145. It can also be seen that the cylindrical housing 102 is sealed at the lower end thereof by the cooperation between the cylindrical sleeve 145 and the seal rings 183 and 184, and is closed at the upper end thereof by the cap 115. Water is prevented from entering the opening 103 in the cylindrical housing 102 through the associated tubular strut 105 by reason of the watertight seal between baseplate 106, the mounting flange 122 and the plate 78 provided by the gaskets 119 and 127. The sealed enclosure for the drive mechanism prevents suction during closure of the valve module which might draw water up inside the strut 105, and instead causes compression of the air in the cylindrical housing 102 which tends to expel water from the bottom thereof.

In a constructional example of the valve module 100, the housing assembly 101 and the seal liner 120 are preferably formed of steel, with the wear surfaces of the members 148 on the cylindrical sleeve 145 being formed of COLMONOY weld material and the seal ring 126 being formed of MONEL metal. The gaskets 114, 119, 127 and 146 are all preferably formed of neoprene rubber, as are the seal ring 129 and the resilient lining 170 of the valve member 150. Alternatively, the lining 170 may be constructed of any suitable resilient material, such as cork or the like.

While the valve clevis plate 165 has been disclosed as a separate member bolted in place on the well baseplate 153 of the valve member 150, it will be understood that it could also be formed integrally with the well baseplate 153 or permanently welded thereto.

Figure 9:
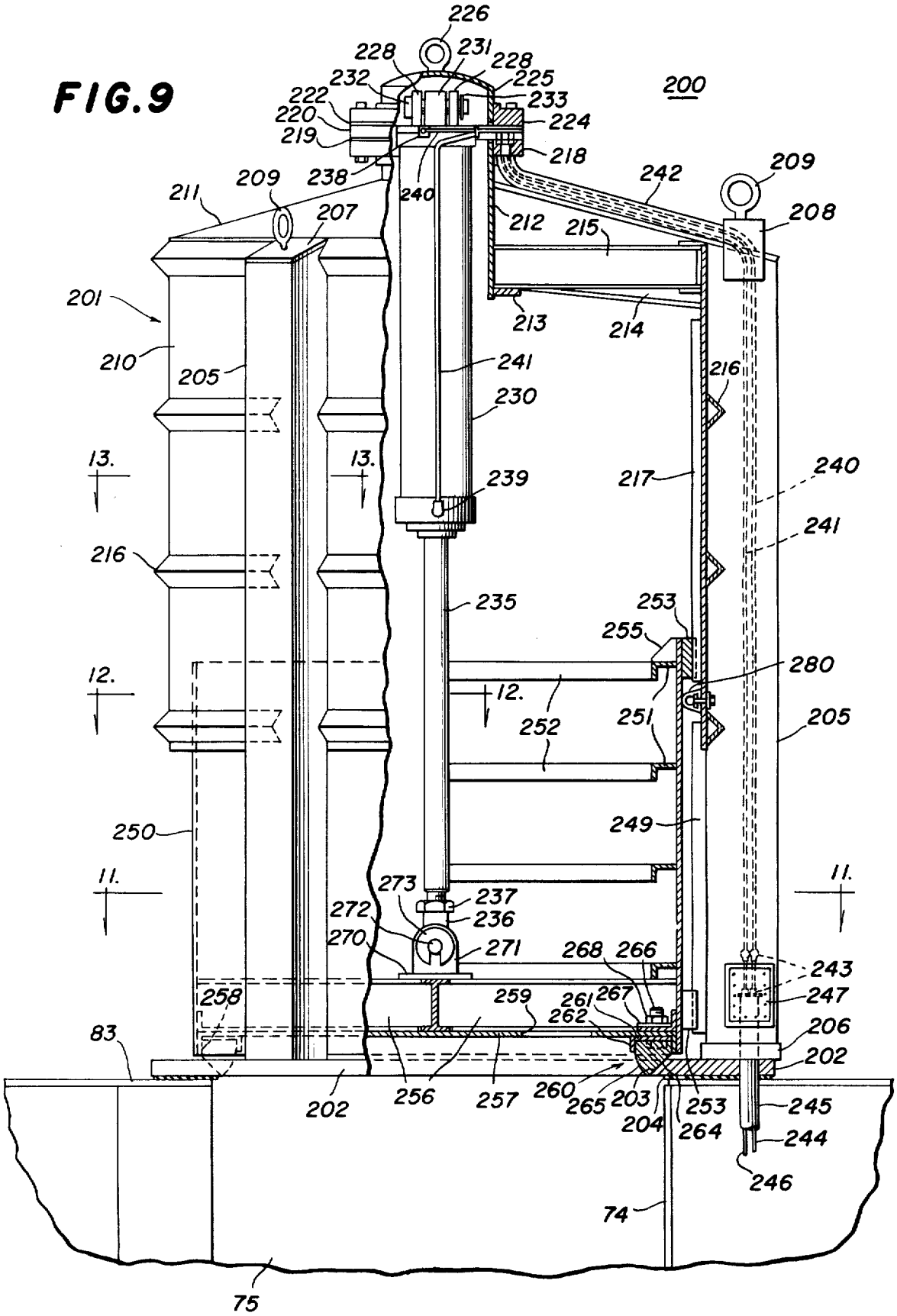
FIG. 9 is a side elevational view in partial vertical section of a hopper valve module constructed in accordance with and embodying the features of a second embodiment of the present invention, and illustrating the internal construction of the module, the valve being shown in the closed position thereof.
Figure 10:
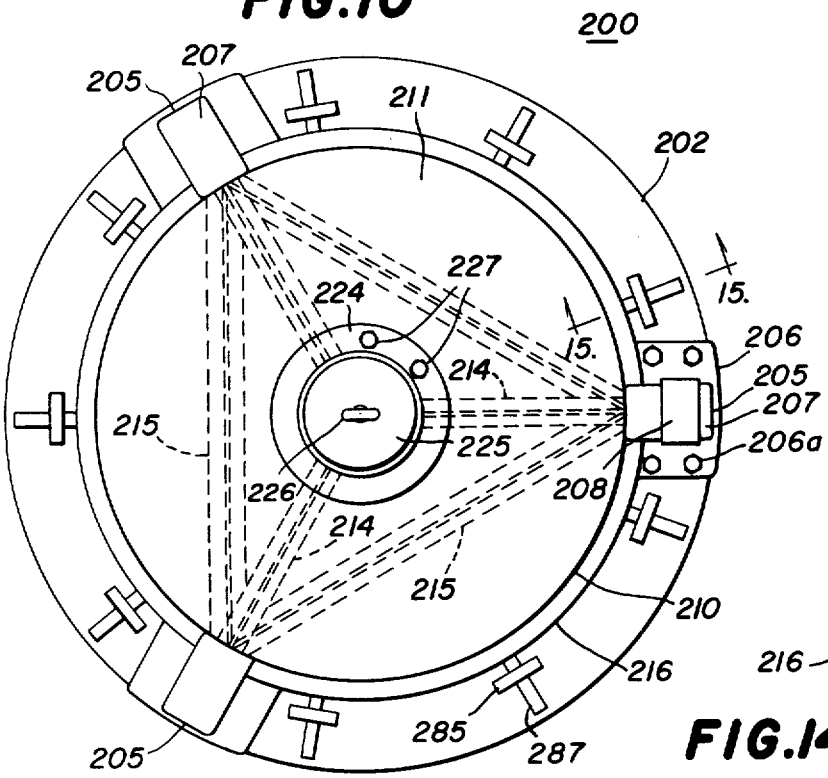
FIG. 10 is a reduced top plan view of the hopper valve module illustrated in FIG. 9.
Figure 12:
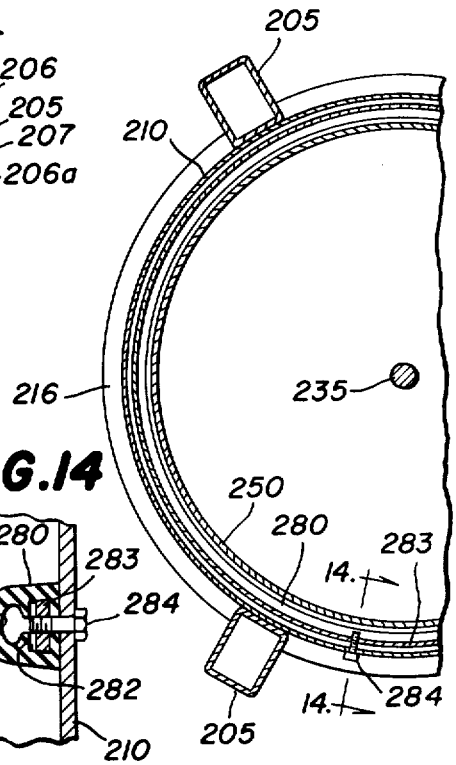
FIG. 12 is a reduced fragmentary view in horizontal section taken along the line 12—12 in FIG. 9.

Referring now to FIGS. 9 through 15 of the drawings, there is illustrated a valve module, generally designated by the numeral 200, constructed in accordance with and embodying the features of a second embodiment of the present invention. The valve module 200 is illustrated in FIG. 9 mounted in place around the upper end of the well 75 of a hopper which may be identical to the hoppers 70 illustrated in FIG. 1, but is illustrated in FIG. 9 as having a flat bottom wall 83. The valve module 200 includes a housing assembly, generally designated by the numeral 201, which includes an annular metal baseplate 202 disposed in use in surrounding relationship with the upper end of the well 75, and being supported upon the hopper bottom plate 83 and spaced therefrom by an annular gasket 204. The baseplate 202 has a tapered inner edge defining a frustoconical seal surface 203 which overhangs the side wall 74 of the well 75 by a slight distance.

Supported upon the baseplate 202 at equiangularly spaced-apart points therealong and extending vertically upwardly therefrom are three hollow support columns 205, each being substantially rectangular in transverse cross section and having the lower end thereof fixedly secured as by welding to a footplate 206 which is in turn fixedly secured to the baseplate 202 by bolts 206a. Each of the support columns 205 is closed at the upper end thereof by a cover plate 207 to which an eyebolt 209 is secured, either directly or by means of a mounting bracket 208, the eyebolts 209 serving to facilitate lowering and raising the valve module 200 to or from its installed position illustrated in FIG. 9.

Fixedly secured as by welding to the inner surfaces of the support columns 205 is a circular cylindrical housing 210, disposed substantially coaxially with the well 75 and extending vertically downwardly from the tops of the columns 205 to a point slightly below the midpoints thereof, so that the bottom edge of the housing 210 is spaced a substantial distance from the bottom plate 83 of the hopper 70 and cooperates therewith to define a passage beneath the housing 210. The top of the housing 210 is covered with a frustoconical cover plate 211, the inner edge of which is fixedly secured as by welding in a watertight joint to an inner cylinder 212 which projects upwardly and downwardly above and below the top of the cover plate 211 and is substantially coaxial with the housing 210. Fixedly secured to the inner cylinder 212 adjacent to the lower end thereof and extending radially outwardly therefrom is an annular stiffening flange 213.

Fixedly secured to the stiffening flange 213 and the inner cylinder 212 at equiangularly spaced-apart points therearound are three radially outwardly extending I-beams 214, the outer ends of which are fixedly secured to the upper end of the housing 210 at the support columns 205. Respectively extending between the outer ends of the radial I-beams 214 and fixedly secured thereto are three diagonal I-beams 215, the I-beams 214 and 215 cooperating with the inner cylinder 212, the housing 210 and the support columns 205 to provide a bracing assembly for the valve module 200 which serves to evenly distribute lateral forces applied to the valve module 200 by the dredged cargo in the hopper to prevent "tipping" of the valve module 200. Fixedly secured to the outer surface of the housing 210 and extending circumferentially thereabout between the support columns 205 are a plurality of vertically spaced-apart stiffening ribs 216, each being generally V-shaped in transverse cross section, with the apex of the V extending laterally. Respectively fixedly secured to the inner surface of the housing 210 at the support columns 205 are three elongated and vertically extending guide rails 217, each projecting radially inwardly of the housing 210 a slight distance.

Mounted on the inner cylinder 212 above the cover plate 211, and extending radially outwardly is a slip-on collar 218, an annular clevis plate 220 being supported on the collar 218 and spaced therefrom by a gasket 219. Overlying the clevis plate 220 and spaced therefrom by a gasket 222 is an annular slip-on collar 224, to the inner surface of which is secured a cap 225 for closing the upper end of the cylinder 212. The collars 218 and 224, the gaskets 219 and 222 and the clevis plate 220 are all preferably secured together by a plurality of bolts 227. Fixedly secured to the cap 225 is an eyebolt 226 to further facilitate raising and lowering of the valve module 200.

The clevis plate 220 is provided with a pair of upstanding spaced-apart clevis posts 228, between which is received the mounting tongue 231 of a hydraulic drive cylinder 230, the cylinder 230 being disposed beneath the clevis plate 220, with the mounting tongue 231 extending upwardly therethrough. Extending through complementary openings in the tongue 231 and the clevis posts 228 to form a pivot joint is a mounting pin 232, which is preferably headed on one end, the other end being held in place by a cotter pin 233, for supporting the drive cylinder 230. The drive cylinder 230 extends vertically downwardly beyond the lower end of the inner cylinder 212 coaxially therewith, and is provided with a piston rod 235, the lower end of which is provided with a coupling knuckle 236, the extension of which is adjustable by an adjustment nut 237, and is extendable in use well below the lower end of the housing 210.

The drive cylinder 230 is provided at the upper and lower ends thereof, respectively, with an extension fitting 238 and a retraction fitting 239, which are in turn respectively coupled to hydraulic lines 240 and 241, which extend through passages in the clevis plate 220 and the collar 218 and thence through a conduit 242 to the inside of one of the support columns 205. The hydraulic lines 240 and 241 extend downwardly through the column 205 and are coupled at the lower ends thereof by swivel fittings 243 to hydraulic lines 244 and 246, which project from a cylindrical sleeve 245 which extends downwardly through complementary openings in the footplate 206, the baseplate 202, the gasket 204 and the hopper bottom plate 83 into the hold of the vessel, and thence to an associated hydraulic system (not shown). Access to the swivel fittings 243 and to the sleeve 245 is provided by an access panel 247 in the lower end of the column 205. It will be appreciated that the hydraulic lines 240 and 241 could also be coupled to the hydraulic system of the vessel 50 by the use of the watertight coupling compartment 190 as illustrated in FIG. 3.

The valve module 200 also includes a circular cylindrical valve member 250 which is telescopically received within the cylindrical housing 210 coaxially therewith and has an axial extent slightly greater than the axial distance between the lower end of the housing 210 and the baseplate 202, the inner diameter of the valve member 250 being slightly greater than the inner diameter of the baseplate 202. Fixedly secured to the inner surface of the valve member 250 and extending circumferentially therearound are a plurality of vertically spaced-apart annular stiffening rings 251, each of which is provided with an integral and downwardly extending cylindrical flange 252 at the inner edge thereof. Fixedly secured to the outer surface of the valve member 250 respectively adjacent to the support columns 205 are three pairs of vertically aligned and spaced-apart guide shoes 253, the shoes 253 of each pair being respectively disposed adjacent to the upper and lower ends of the valve member 250. Each of the guide shoes is provided with a vertically extending slot or groove 254 in the outer surface thereof, the upper ones of the guide shoes 253 being respectively adapted to receive in the grooves 254 thereof the guide rails 217 in sliding engagement therewith, while the lower ones of the guide shoes 253 are disposed so that the slots 254 thereof respectively receive therein elongated guide rails 249 which respectively extend vertically downwardly along the inner surfaces of the support columns 205 from adjacent to the lower end of the housing 210 to adjacent to the lower ends of the columns 205, in vertical alignment with the guide rails 217. Preferably, mounting yokes 255 are provided at the upper end of the valve member 250 for mounting the upper ones of the guide shoes 253.

Fixedly secured to the inner surface of the valve member 250 adjacent to the lower end thereof at equiangularly spaced-apart points therealong are four radially inwardly extending I-beams 256, the inner ends of which are coupled together at the axis of the valve member 250. Fixedly secured to the bottoms of the I-beams 256 is a circular bottom plate 257 provided at the outer edge thereof with an integral downturned cylindrical attachment flange 258 secured to the inner surface of the valve member 250 as by welding. The bottom plate 257 closes the lower end of the valve member 250, but is provided with a plurality of circular openings 259 therein, to permit the drainage of water which may find its way inside the housing 210 in the valve member 250.

Fixedly secured to the underside of the bottom plate 257 is a bottom seal assembly, generally designated by the numeral 260, which includes an annular seal retainer plate 261 extending around the perimeter of the bottom plate 257 and having at the inner edge thereof an integral downwardly extending cylindrical flange 262. Nested beneath the seal retainer plate 261 between the flange 262 thereof and the flange 258 of the bottom plate 259 is a resilient annular seal member 265, preferably fixedly secured to the valve member 250 by a plurality of bolts 266, washer plates 267 and nuts 268. The seal member 265 is provided with a downwardly and inwardly sloping annular frustoconical seal surface 264 disposed for mating engagement with the seal surface 203 on the baseplate 202 to provide a watertight seal therebetween.

Overlying the inner ends of the radial I-beams 256 and fixedly secured thereto is a clevis plate 270 having a pair of upstanding spaced-apart clevis legs 271 adapted to receive therebetween the coupling knuckle 236 of the piston rod 235. A headed coupling pin 272 extends through complementary openings in the coupling knuckle 236 and the clevis legs 271 for forming a pivot joint therebetween, a retaining collar 273 being provided for retaining the pin 272 in place. It will be understood that as the piston rod 235 is extended and retracted, the valve member 250 is moved vertically upwardly and downwardly between a closed position illustrated in FIG. 9, wherein the baseplate 202 and the seal member 265 are in sealing engagement with each other, and an open position (not shown) wherein the valve member 250 is pulled upwardly within the housing 210.

Figure 14:
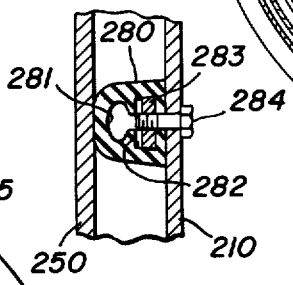
FIG. 14 is an enlarged fragmentary view in vertical section taken along the line 14—14 in FIG. 12, and illustrating the side seal member.
Figure 11:
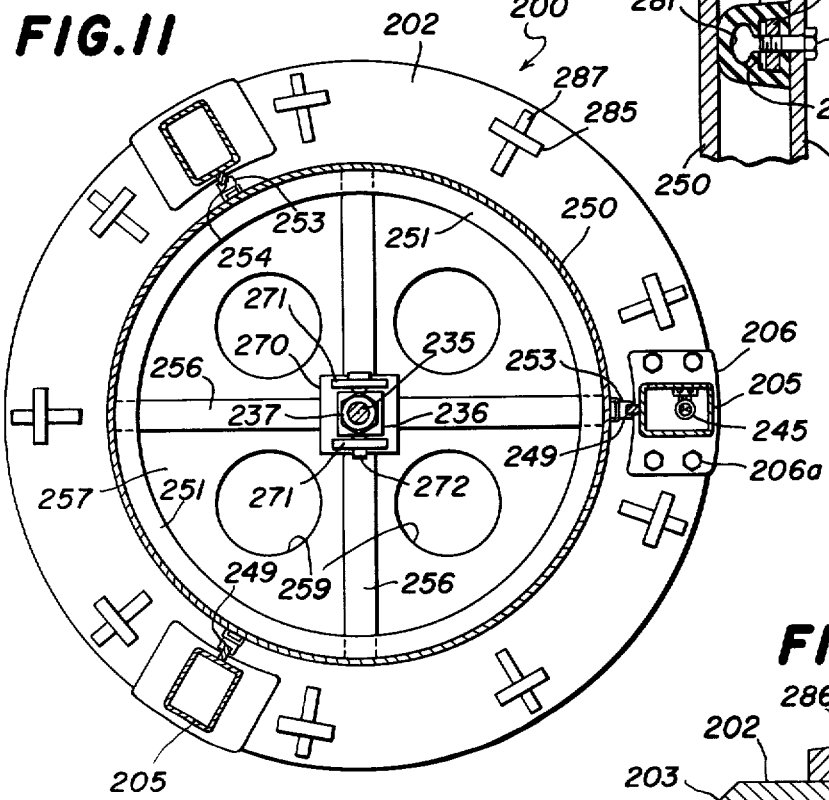
FIG. 11 is a reduced view in horizontal section taken along the line 11—11 in FIG. 9.
Figure 13:
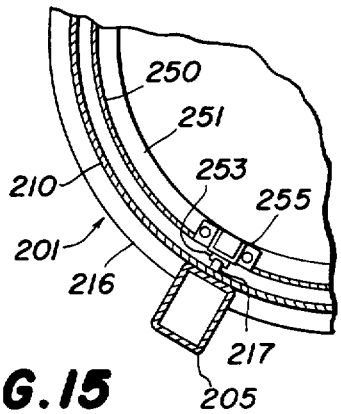
FIG. 13 is a reduced fragmentary view in horizontal section taken along the line 13—13 in FIG. 9.
Figure 15:
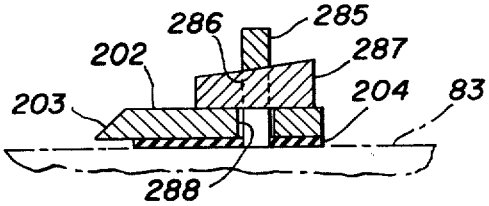
FIG. 15 is an enlarged view in vertical section taken along the line 15—15 in FIG. 10 and illustrating one of the wedge-type hold down means for the valve module.

Fixedly secured to the inner surface of the housing 210 between the lower ends of the guide rails 217 and the upper ends of the guide rails 249 is an annular resilient side seal member 280 extending around the entire periphery of the housing 210. Referring in particular to FIG. 14 of the drawings, the side seal member 280 is preferably formed of rubber or the like and is provided with an inner annular recess having a lobe 281 which is substantially oval in transverse cross section and a lobe 282 which is substantially rectangular in transverse cross section, the lobe 282 receiving therein a cylindrical mounting ring 283 having threaded openings at equidistantly spaced-apart points therearound for respectively receiving in threaded engagement therein mounting bolts 284 which extend through complementary openings in the housing 210. The side seal member 280 is disposed in sliding engagement with the outer surface of the valve member 250, thereby closing the space between the valve member 250 and the housing 210 and providing a substantially watertight seal therebetween, while accommodating vertical movement of the valve member 250. The lobe 281 of the inner recess of the side seal member 280 increases the flexibility thereof of facilitate the sliding engagement with the valve member 250.

Preferably, the bottom plate 83 of the hopper is provided with a plurality of upstanding dogplates 285 spaced around the perimeter of the well 75 a slight distance therefrom. Each of the dogplates 285 is generally in the shape of an upstanding bail having a passage or aperture 286 extending therethrough radially of the valve module 200, the dogplates 285 being respectively received through complementary openings 288 in the baseplate 202, and like openings in the gasket 204 (see FIG. 15). When the valve module 200 is mounted in place on the hopper bottom plate 83, the dogplates 285 extend well above the upper surface of the baseplate 202. A plurality of wedge members 287 are then respectively driven radially inwardly through the passages 286 above the baseplate 202 for cooperation therewith securely to hold the valve module 200 in place on the hopper bottom 83.

In operation, it will be appreciated that when the valve module 200 is installed in place above the hopper well 75, with the valve member 250 in the closed position thereof, as illustrated in FIG. 9, the valve member 250 cooperates with the seal assembly 265 and the baseplate 202, and with the side seal member 280 and the closed-top housing 210 to completely close the hopper well 75 and the associated hopper outlet, effectively preventing dredged material in the hopper from passing to and through the well 75.

When it is desired to empty the hopper contents, hydraulic fluid is applied to the lower end of the drive cylinder 230 for retracting the piston rod 235, thereby pulling the valve member 250 upwardly into the housing 210, this vertical movement being guided by the guide rails 217 and 249 and the guide shoes 253. When the valve member 250 is thus moved to its open position, the passage beneath the housing 210 is opened, permitting the dredged cargo in the hopper to flow beneath the housing 210 and around the lower ends of the support columns 205 through the well 75 and the hopper outlet. When the hopper contents have been completely discharged, the valve member 250 may be returned to its closed position by extending the piston rod 235 through the application of fluid to the upper end of the drive cylinder 230. It will be appreciated that as the valve member 250 moves up and down between the open and closed positions thereof, the side seal member 280 serves not only to provide a watertight seal between the housing 210 and the valve member 250, but also serves to wipe dredged cargo and other foreign material from the outer surface of the valve member 250.

When it is desired to remove the valve module 200 from the hopper for servicing or the like, the hydraulic lines 240 and 241 are disconnected, the wedges 287 are driven outwardly from the dogplates 285, and the entire valve module 200 is then hoisted upwardly through the hopper 70 to the deck of the vessel 50 by suitable hoisting equipment, with the aid of the eyebolts 209 and 226. In like manner, when servicing is complete, the valve module 200 is again lowered into place over the well 75, the wedges 287 are replaced in the dogplates 285 and the hydraulic lines 240 and 241 are reconnected to the hydraulic system of the vessel.

It is a significant feature of this invention that in the valve module 200 no portion of the mechanism thereof is at any time disposed below the bottom of the vessel 50. Thus, no portion of the valve mechanism is exposed and vulnerable to bending or other damage from grounding or from encounters with debris or the thrust of the current passing beneath the bottom of the vessel 50. Furthermore, there is no danger of the valve mechanism being buried in the discharged cargo where the discharge takes place in shallow waters.

In a constructional example of the valve module 200, the housing assembly 201 and the valve member 250 are preferably formed of steel, while the gaskets 204, 219 and 222, as well as the seal members 265 and 280 are all preferably formed of rubber.

From the foregoing it can be seen that there has been provided a novel valve module for opening and closing the outlet of a hopper, and in particular a hopper in a hopper dredge vessel. The valve module is unique in that the drive mechanism therefor is self-contained therein, whereby there is no linkage or connection extending from the closure member upwardly through the hopper to the deck of the vessel, thereby rendering the valve module readily and easily removable for onboard servicing, without dry-docking of the vessel.

In addition, there has been provided a valve module which affords freer downward movement of the dredged cargo through the hopper, as well as operation of the valve module with a minimum of power, all by reason of the elimination of drive linkage and associated supports extending through the dredged cargo so as to eliminate the frictional interference occasioned thereby.

There has also been provided a valve module which affords a leakproof closure of the hopper outlet, while at the same time providing efficient discharge of dredged material therefrom. The improved construction of the valve module facilitates servicing and repair of the valve member to maintain the leakproof condition of the hopper closure.

More particularly, there has been provided a valve module having a frustoconical discharge nozzle and conical valve member with a replaceable resilient liner thereon for sealing engagement with a rigid seal ring at the outer end of the nozzle. There has also been provided a unique universal coupling between the valve member and the drive means to permit free movement of the valve member to find the best seal upon closure thereto to insure a watertight fit.

There has also been provided a valve module which includes a hydraulic drive mechanism which is completely enclosed within a watertight housing, and therefore may safely be buried within the dredged material which is pumped into the hopper.

There has also been provided a valve module of the character described, wherein no portion of the valve module is at any time disposed below the bottom of the vessel.

There has also been provided a valve module having a cylindrical housing supported a predetermined distance above the hopper outlet and a cylindrical valve member telescopically received within the housing and movable axially thereof for opening and closing the passage therebeneath, the valve member having a replaceable resilient annular seal member at the lower end thereof for sealing engagement with an annular seal ring adjacent to the hopper outlet.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. In a hopper dredge vessel having a hopper with *side walls and* an outlet at the bottom thereof, a removable hopper valve module comprising housing means removably mountable on the associated hopper adjacent to the outlet thereof *with no portion of said housing extending laterally underneath any portion of the side walls of the associated hopper* a *single* valve member movable in use *substantially axially of the hopper outlet* between a closed position closing the hopper outlet and an open position opening the hopper outlet, and drive means carried substantially solely by said housing means and coupled to said valve member for effecting movement thereof between the open and closed positions thereof, said valve module being connected to the associated vessel only adjacent to the hopper outlet and adaptably mounted so as to be readily attached [and removed] as a unit [from] *to* the hopper *and removed as a unit from the hopper upwardly therethrough in either the open or closed position of said valve member.*

2. The hopper valve module set forth in claim 1, and further including threaded fastening means removably securing said housing means to the associated hopper.

3. The hopper valve module set forth in claim 1, wherein the associated hopper includes inverted U-shaped dog members extending upwardly therefrom at spaced-apart points around the periphery thereof, said housing means including a base member having apertures therein, said housing means being disposed in use with said dog members respectively extending upwardly through said apertures a predetermined distance above said base member, and wedge members respectively received through said dog members above said base member and cooperating therewith removably to secure said housing means to the associated hopper.

4. The hopper valve module set forth in claim 1, wherein said valve member is moved substantially vertically between the open and closed positions thereof.

5. The hopper valve module set forth in claim 1, wherein said drive means comprises a hydraulically operated drive cylinder.

6. The hopper valve module set forth in claim 1, wherein said housing means includes means providing a watertight enclosure for said drive means.

7. The hopper valve module set forth in claim 1, wherein said valve member is movable in use beneath the bottom of the associated vessel.

8. The hopper valve module set forth in claim 1, wherein said valve member is at all times disposed above the bottom of the associated vessel.

9. In a hopper dredge vessel having a hopper with *side walls and* an outlet at the bottom thereof, a removable hopper valve module comprising support means removably mountable on the associated hopper adjacent to the outlet thereof, a hollow cylindrical housing carried by said support means and disposed in use substantially vertically adjacent to the hopper outlet *with no portion of said support means or said housing extending laterally underneath any portion of the side walls of the associated hopper*, a valve member movable in use between a closed position closing the hopper outlet and an open position opening the hopper outlet, and drive means mounted substantially totally within said cylindrical housing and coupled to said valve member for effecting movement thereof between the [opening] *open* and closed positions thereof, said valve module being connected to the associated vessel only adjacent to the hopper outlet and adaptably mounted so as to be readily attached [and removed] as a unit [from] *to* the hopper *and removed as a unit from the hopper upwardly therethrough in either the open or closed position of said valve member.*

10. The hopper valve module set forth in claim 9, wherein said drive means comprises a fluid-actuated drive cylinder.

11. The hopper valve module set forth in claim 9, wherein said support means includes a plurality of spaced-apart support members connected to said cylindrical housing and positioning said cylindrical housing in use substantially coaxially with the hopper outlet.

12. The hopper valve module set forth in claim 9, wherein said support means includes a plurality of spaced-apart hollow tubular support members connected to said cylindrical housing and positioning said housing in use substantially coaxially with the hopper outlet, at least one of said tubular support members communicating with the interior of said housing for accommodating passage of control connections for said drive means through said one tubular support member and into said housing.

13. The hopper valve module set forth in claim 9, wherein the hopper outlet and said cylindrical housing are substantially circular in transverse cross section.

14. In a hopper dredge vessel having a hopper with *side walls and* an outlet at the bottom thereof, a removable hopper valve module comprising housing means removably mountable on the associated hopper adjacent to the outlet thereof *with no portion of said housing extending laterally underneath any portion of the side walls of the associated hopper*, a valve seat coupled to said housing means and disposed adjacent to the hopper outlet, a *single* valve member movable in use *substantially axially of the hopper outlet* between a closed position disposed against said valve seat and cooperating therewith and with said housing means for closing and watertight sealing the hopper outlet and an open position spaced from said valve seat for opening the hopper outlet, and drive means carried substantially solely by said housing means and coupled to said valve member for effecting movement thereof between the open and closed positions thereof, said valve module being connected to the associated vessel only adjacent to the hopper outlet and adaptably mounted so as to be readily attached [and removed] as a unit [from] *to* the hopper *and removed as a unit from the hopper upwardly therethrough in either the open or closed position of said valve member.*

15. The hopper valve module set forth in claim 14, wherein said valve seat is annular in shape, said valve member having a frustoconical surface which engages said valve seat in the closed position of said valve member.

16. The hopper valve module set forth in claim 14, wherein said valve seat is rigid, said valve member having a resilient portion which engages said valve seat in the closed position of said valve member.

17. The hopper valve module set forth in claim 14, wherein said valve seat is formed of hard rigid corrosion-resistant metal, said valve member having a resilient portion formed of rubber which engages said valve seat in the closed position of said valve member.

18. The hopper valve module set forth in claim 14, wherein said valve seat is formed of hard rigid corrosion-resistant metal, said valve member having a resilient portion replaceably mounted thereon, said resilient portion engaging said valve seat in the closed position of said valve member.

19. The hopper valve module set forth in claim 14, wherein the hopper has a cylindrical well at the bottom thereof forming the outlet, said valve seat being disposed adjacent to the bottom of the well.

20. The hopper valve module set forth in claim 14, wherein the hopper has a cylindrical well at the bottom thereof forming the outlet, said valve seat being disposed adjacent to the top of the well.

21. In a hopper dredge vessel having a hopper with an outlet at the bottom thereof, a removable hopper valve module comprising housing means removably mountable on the associated hopper adjacent to the outlet thereof, a valve seat coupled to said housing means and disposed adjacent to the hopper outlet, a valve member movable in use between a closed position disposed against said valve seat and cooperating therewith and with said housing means for closing and watertight sealing the hopper outlet and an open position spaced from said valve seat for opening the hopper outlet, and drive means carried substantially solely by said housing means and including a movable joint coupled to said valve member for effecting movement thereof between the open and closed positions thereof, said movable joint accomodating lateral movement of said valve member into snug engagement against said valve seat to provide a watertight seal therebetween, said valve module being connected to the associated vessel only adjacent to the hopper outlet and adaptably mounted so as to be readily attached and removed as a unit from the hopper.

22. The hopper valve module set forth in claim 21, wherein said drive means includes a hydraulically operated drive cylinder having a piston rod connected to said movable joint.

23. The hopper valve module set forth in claim 21, wherein said movable joint is a universal joint.

24. The hopper valve module set forth in claim 21, wherein said movable joint is a single pivot joint.

25. The hopper valve module set forth in claim 21, wherein said housing means includes seal means cooperating with said valve member to form a watertight enclosure for said drive means.

26. In a hopper dredge vessel having a hopper with an outlet at the bottom thereof, a removable hopper valve module comprising support means removably mountable on the associated hopper adjacent to the outlet thereof, a hollow cylindrical housing carried by said support means and disposed in use substantially vertically adjacent to the hopper outlet, a valve member movable in use between a closed position closing the hopper outlet and an open position opening the hopper outlet, drive means mounted substantially totally within said cylindrical housing and coupled to said valve member for effecting movement thereof between the open and closed positions thereof, a cylindrical sleeve disposed telescopically within said housing and in surrounding relationship with said drive means, said sleeve being coupled at the lower end thereof to said valve member for movement therewith between the open and closed positions thereof, and seal means coupled to said housing and to said sleeve for sealing the lower ends thereof and rendering them substantially watertight, said valve module being connected to the associated vessel only adjacent to the hopper outlet and adaptably mounted so as to be readily attached and removed as a unit from the hopper.

27. The hopper valve module set forth in claim 26, wherein said seal means includes an annular seal ring mounted on said housing at the lower end thereof, said seal ring having a resilient annular seal member disposed in use against the outer surface of said cylindrical sleeve for providing a watertight seal between said sleeve and said housing while accommodating relative axial movement therebetween.

28. The hopper valve module set forth in claim 26, wherein said seal means includes an annular seal ring mounted on said housing at the lower end thereof, said seal having a resilient annular seal member disposed in use against the outer surface of said cylindrical sleeve for providing a watertight seal between said sleeve and said housing while accommodating relative axial movement therebetween, and an annular scraper carried by said seal ring and having a scraping disposed in use closely adjacent to the outer surface of said sleeve for scraping foreign material therefrom as said sleeve moves with respect to said housing.

29. The hopper valve module set forth in claim 26, and further including a flexible collar attached to said valve member and extending upwardly therefrom the surrounding relationship with the lower end of said sleeve and secured thereto for cooperation therewith to enclose said drive means.

30. The hopper valve module set forth in claim 26, and further including a cap closing the upper end of said housing and providing a watertight seal therefor.

31. In a hopper dredge vessel having a hopper with *side walls and* an outlet at the bottom thereof, a removable hopper valve module comprising housing means removably mountable on the associated hopper adjacent to the outlet thereof *with no portion of said housing extending laterally underneath any portion of the side walls of the associated hopper*, a discharge nozzle having an inverted frustoconical inner surface and being carried by said housing means and communicating with the hopper outlet for discharge of the hopper contents through said nozzle, a *single* valve member movable [in] *is* use *substantially axially of the hopper outlet* between a closed position closing said nozzle and an open position opening said nozzle, and drive means carried substantially solely by said housing means and coupled to said valve member for effecting movement thereof between the open and closed positions thereof, said valve module being connected to the associated vessel only adjacent to the hopper outlet and adaptably mounted so as to be readily attached [and removed] as a unit [from] *to* the hopper *and removed as a unit from the hopper upwardly therethrough in either the open or closed position of said valve member.*

32. The hopper valve module set forth in claim 31, wherein said drive means extends in use axially through said discharge nozzle.

33. The hopper valve module set forth in claim 31, wherein the hopper has a cylindrical well at the bottom thereof forming the outlet, said discharge nozzle being disposed within the well coaxial therewith.

34. The hopper valve module set for in claim 31, wherein the hopper has a cylindrical well at the bottom thereof forming the outlet, said discharge nozzle being disposed within the well coaxial therewith, and further including an annular seal member carried by said discharge nozzle and disposed in use in engagement with the surrounding well for sealing the space between the well and said discharge nozzle.

35. The hopper valve module set forth in claim 31, wherein the hopper has a cylindrical well at the bottom thereof forming the outlet, said discharge nozzle being disposed within the well coaxial therewith, said discharge nozzle being provided with an annular attachment flange at the upper end thereof extending radially outwardly therefrom for attachment to the associated hopper at the upper end of the well in surrounding relationship therewith, said housing means including an annular mounting ring overlying and attached to said attachment flange, and means connected to said mounting ring for supporting and enclosing said drive means substantially axially of said nozzle.

36. In a hopper dredge vessel having a hopper with a cylindrical substantially vertically extending well at the bottom thereof forming an outlet, a removable hopper valve module comprising support means removably mountable on the associated hopper adjacent to the well thereof, a discharge nozzle carried by said support means and disposed within the well coaxial therewith, said discharge nozzle having an inverted frustoconical inner surface and communicating with the interior of the hopper for discharge of the contents thereof through said nozzle, a hollow cylindrical housing carried by said support means and extending in use axially into said nozzle, a valve seat carried by said nozzle and extending peripherally thereof at the outer end thereof, a valve member movable in use between a closed position disposed against said valve seat and cooperating therewith for closing and sealing the hopper outlet and an open position spaced from said valve seat for opening the hopper outlet, drive means mounted substantially totally within said cylindrical housing and including a movable joint coupled to said valve member for effecting movement thereof between the open and closed positions thereof, said movable joint accommodating movement of said valve member into snug engagement against said valve seat to provide a watertight seal therebetween, a cylindrical sleeve disposed telescopically within said housing and in surrounding relationship with said drive means, said sleeve being coupled at the lower end thereof to said valve member for movement therewith between the open and closed positions thereof, and seal means coupled to said housing and to said sleeve for sealing the lower ends thereof and rendering them substantially watertight, said valve module being connected to the associated vessel only adjacent to the hopper outlet and adaptably mounted so as to be readily attached and removed as a unit from the hopper.

37. In a hopper dredge vessel having a hopper with an outlet at the bottom thereof, a removable hopper valve module comprising support means removably mountable on the associated hopper adjacent to the outlet thereof, a hollow cylindrical housing carried by said support means and disposed in use substantially vertically above the hopper outlet, said housing having a closed top and having an open bottom disposed in use a predetermined distance above the hopper bottom and cooperating therewith to define a passage accommodating free flow of dredged material beneath said housing and to the outlet, a cylindrical valve member disposed in use coaxially with said housing and movable between a closed position closing said passage to prevent the flow of dredged material to the outlet and an open position opening said passage, and drive means mounted substantially totally within said housing and coupled to said valve member for effecting movement thereof between the open and closed positions thereof, said valve module being connected to the associated vessel only adjacent to the hopper outlet and adaptably mounted so as to be readily attached and removed as a unit from the hopper.

38. The hopper valve module set forth in claim 37, wherein said valve member is telescopically received within said housing for movement coaxially thereof between the open and closed positions of said valve member.

39. The hopper valve module set forth in claim 37, and further including first guide means carried by said support means, and second guide means carried by said valve member for engagement with said first guide means to guide the movement of said valve member between the open and closed positions thereof.

40. The hopper valve module set forth in claim 37, wherein said housing includes bracing means for evenly distributing lateral forces applied against said housing by the dredged cargo.

41. The hopper valve module set forth in claim 37, wherein said drive means includes a movable joint, and laterally extending means coupling said movable joint to said valve member.

42. In a hopper dredge vessel having a hopper with an outlet at the bottom thereof, a removable hopper valve module comprising support means removably mountable on the associated hopper adjacent to the outlet thereof, a hollow cylindrical housing carried by said support means and disposed in use substantially vertically above the hopper outlet, said housing having a closed top and having an open bottom disposed in use a predetermined distance above the hopper bottom and cooperating therewith to define a passage accommodating free flow of dredged material beneath said housing and to the outlet, a valve seat coupled to said support means and disposed adjacent to the hopper outlet, a cylindrical valve member disposed in use coaxially with said housing and movable between a closed position disposed against said valve seat and cooperating therewith and with said housing for closing said passage to prevent the flow of dredged material to the outlet and an open position spaced from said valve seat for opening said passage, and drive means mounted substantially totally within said housing and coupled to said valve member for effecting movement thereof between the open and closed positions thereof, said valve module being connected to the associated vessel only adjacent to the hopper outlet and adaptably mounted so as to be readily attached and removed as a unit from the hopper.

43. The hopper valve module set forth in claim 42, and further including annular seal means carried by said cylindrical housing adjacent to the bottom thereof, said annular seal means being disposed in use in sliding engagement with the outer surface of said cylindrical valve member for providing a watertight seal between said housing and said valve member.

44. The hopper valve module set forth in claim 42, wherein said valve seat includes an annular frustoconical seal surface, said hopper valve module further including annular resilient seal means removably mounted on said valve member and extending about the periphery thereof adjacent to the bottom thereof, said seal means having a frustoconical surface disposable in mating engagement with the frustoconical seal surface of said valve seat for cooperation therewith to provide a watertight seal between said valve member and said valve seat.

* * * * *